(12) United States Patent
Raymond et al.

(10) Patent No.: US 9,549,533 B2
(45) Date of Patent: *Jan. 24, 2017

(54) ORGANICALLY BASED ANIMAL LITTER AND MANUFACTURING PROCESS

(71) Applicant: Green Products Company, Conrad, IA (US)

(72) Inventors: Marvin L. Raymond, Wildwood, MO (US); David J. Tooker, New Bern, NC (US)

(73) Assignee: GREEN PRODUCTS COMPANY, Conrad, IA (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/075,341

(22) Filed: Nov. 8, 2013

(65) Prior Publication Data
US 2015/0128869 A1    May 14, 2015

(51) Int. Cl.
*A01K 1/015* (2006.01)

(52) U.S. Cl.
CPC ........... *A01K 1/0155* (2013.01); *A01K 1/0154* (2013.01)

(58) Field of Classification Search
CPC .................................................. A01K 1/0155
USPC ................................................ 119/171, 173
See application file for complete search history.

(56) References Cited

U.S. PATENT DOCUMENTS

| | | | | |
|---|---|---|---|---|
| 3,622,373 A * | 11/1971 | Page | .................... | B41C 1/1016 101/455 |
| 4,930,443 A * | 6/1990 | Lowe, Jr. | ............. | A01K 1/0152 119/171 |
| 5,094,189 A * | 3/1992 | Aylen | .................... | A01K 1/0155 119/173 |
| 5,176,107 A * | 1/1993 | Buschur | ............... | A01K 1/0155 119/171 |
| 5,183,010 A * | 2/1993 | Raymond | ............ | A01K 1/0152 119/172 |
| 5,267,531 A * | 12/1993 | Appel | .................. | A01K 1/0152 119/171 |
| 5,359,961 A * | 11/1994 | Goss | .................... | A01K 1/0155 119/173 |
| 5,452,684 A * | 9/1995 | Elazier-Davis | ....... | A01K 1/0155 119/173 |
| 5,775,259 A * | 7/1998 | Tucker | .................. | A01K 1/0154 119/171 |
| 5,826,543 A * | 10/1998 | Raymond | ............ | A01K 1/0155 119/173 |
| 5,860,391 A * | 1/1999 | Maxwell | ................... | B01J 20/20 119/171 |
| 6,053,125 A * | 4/2000 | Kory | .................... | A01K 1/0155 119/171 |
| 6,089,190 A * | 7/2000 | Jaffee | ................... | A01K 1/0154 119/172 |
| 6,745,720 B2 * | 6/2004 | Rasner | ................. | A01K 1/0152 119/171 |
| 7,603,964 B2 * | 10/2009 | Jenkins | ................ | A01K 1/0154 119/171 |
| 7,971,720 B2 * | 7/2011 | Minkler | ............. | B65D 33/1691 206/503 |

(Continued)

*Primary Examiner* — Marc Burgess
*Assistant Examiner* — Morgan T Barlow
(74) *Attorney, Agent, or Firm* — Polsinelli PC

(57) ABSTRACT

The present disclosure provides a lightweight hybrid clumping animal litter made from organic core particles combined with small amounts of clumping agent, and methods for making the litter.

18 Claims, 3 Drawing Sheets

(56) References Cited

U.S. PATENT DOCUMENTS

| | | | | |
|---|---|---|---|---|
| 8,074,604 B2* | 12/2011 | Swank | ................ | A01K 1/0152 |
| | | | | 119/171 |
| 8,720,375 B2* | 5/2014 | Miller | ................ | A01K 1/0154 |
| | | | | 119/173 |
| 8,733,288 B2* | 5/2014 | Winkleman | ......... | A01K 1/0152 |
| | | | | 119/173 |
| 8,757,092 B2* | 6/2014 | Boote | ................ | A01K 1/0155 |
| | | | | 119/171 |
| 9,084,409 B2* | 7/2015 | Kornmayer | .......... | A01K 1/0152 |
| 2002/0117117 A1* | 8/2002 | Raymond | ............ | A01K 1/0154 |
| | | | | 119/171 |
| 2005/0005870 A1* | 1/2005 | Fritter | ................ | A01K 1/0152 |
| | | | | 119/173 |
| 2005/0160996 A1* | 7/2005 | Weaver | ................ | A01K 1/0155 |
| | | | | 119/171 |
| 2005/0160997 A1* | 7/2005 | Weaver | ................ | A01K 1/0155 |
| | | | | 119/171 |
| 2007/0277739 A1* | 12/2007 | Wang | ................ | A01K 1/0154 |
| | | | | 119/161 |
| 2008/0223302 A1* | 9/2008 | Wang | ................ | A01K 1/0155 |
| | | | | 119/173 |
| 2010/0329590 A1* | 12/2010 | Minkler | ............. | B65D 33/1691 |
| | | | | 383/6 |
| 2013/0180459 A1* | 7/2013 | Zhang | ................ | A01K 1/0155 |
| | | | | 119/165 |

* cited by examiner

ORGANICALLY BASED ANIMAL LITTER AND MANUFACTURING PROCESS

TECHNICAL FIELD

This invention relates to animal litter compositions and related manufacturing methods.

BACKGROUND

Animal litters such as cat litter have been made out of a variety of absorbent materials. Early litter compositions used non-gelling or non-clumping clays, such as montmorillonite and attapulgite. Later, gelling clays, such as sodium bentonite, were used to absorb urine waste into a removable clump. The ability to scoop out all solid waste together with clumps of litter containing urine provided a cleaner litter box and reduced odor.

Litters made entirely from clay such as sodium bentonite have high bulk densities, in the range of 50-65 lbs/cu-ft., making them heavy and therefore difficult and costly to handle, package and transport. Attempts to address this problem by encapsulating particles of lighter weight clays with a coating of heavy, clumping clay like sodium bentonite have produced only marginal reduction in bulk density, to only slightly less than about 60 lbs/cu-ft. Also, the clump formation or strength of the clump for litters primarily made with sodium bentonite may be reduced due to salts and other constituents in animal and in particular cat urine that affect the gelling or clumping of these types of litters.

As an alternative to clays, certain plant-based, organic materials have been used to prepare absorbent granules, which can provide litter of somewhat lower bulk densities. Such materials also have the advantage of providing a recycling stream for materials normally treated as a waste by-product. Examples of such organic materials are wheat grain and by-products from wet milling of corn. Such organic materials however generally do not exhibit good clumping performance, even when containing starch, which has some limited function as a clumping promoter.

SUMMARY

In one aspect, the present disclosure provides a clumping animal litter comprising: core particles comprising about 50% to about 85% by weight of an organic substrate, about 0.01% to about 10.0% by weight of a binding agent impregnating the organic substrate, and about 10% to about 40% by weight of a clumping agent, optionally further comprising a polysaccharide gum or a borated starch comprising about 1% to about 3% by weight of the litter composition. Wherein the binding agent binds the clumping agent to the core particles, and wherein the ratio of organic substrate to total clumping agents is about 4 to 1. The core particles have an external surface and optionally pores in the external surface, and the binding agent is non-uniformly distributed over the external surface and optionally in the pores of the core particles. The clumping agent can comprise, for example, no more than about 20% by weight of the litter. The organic substrate can comprises a non-agglomerated, hard granular, granulized or pelletized organic material. The organic substrate can be selected from the group consisting of corn cob, corn meal, soybean, soybean meal, wheat meal, wheat straw, alfalfa meal, peanut hulls, rice hulls, walnut shells, paper, paper sludge, pine sawdust, diaper fluff, and any combination thereof. In an exemplary litter, the organic substrate comprises corncob grit. The core particles of organic substrate can have a size of about 8 mesh to about 40 mesh (about 2.4 mm to about 0.4 mm); a size of about 10 mesh to about 40 mesh (about 2.0 mm to about 0.4 mm); a size of about 14 mesh to about 20 mesh (about 1.4 mm to about 0.8 mm); or a size of about 14 mesh to about 40 mesh (about 1.4 mm to about 0.4 mm).

In the litter, the binding agent can comprise for example an aqueous solution of an adhesive compound, or an adhesive compound which is liquid at room temperature. The adhesive compound can be selected from a polyvinyl alcohol, guar gum, tara gum, xanthan gum, a hydrocolloid gum, sodium alginate, a latex, a starch, corn syrup, corn syrup solids, and any combination thereof. The adhesive compound can be for example a combination of sodium alginate with at least one polysaccharide other than sodium alginate.

When the binding agent comprises an adhesive compound in aqueous solution, the concentration of the adhesive compound in the aqueous solution can be for example about 0.1% to about 5%, about 0.1% to about 10%, about 0.1% to about 75%, or about 0.1% to about 99%, by weight. In the litter, the ratio of adhesive compounds to the organic material in the litter can be less than about 15% by weight. The litter can have a moisture content of no more than about 10% to about 20% by weight, preferably no more than about 10% to about 12% by weight.

In the litter, the clumping agent can comprise for example a material selected from a gelling clay such as attapulgite, bentonite, kaolinite, sepiolite, a borated polysaccharide gum, and a borated starch, or any combination thereof. In an exemplary litter composition, the clumping agent comprises sodium bentonite. The borated polysaccharide gum can be for example a borated gum selected from sodium alginate, guar gum, tara gum, xanthan gum, locust bean gum, *cassia* gum, carboxymethyl cellulose. A borated starch can be for example borated wheat starch or borated potato starch.

An exemplary clumping animal litter can comprise about 10% to about 40% by weight sodium bentonite and further comprises a combination of sodium alginate gum and sodium borate in a weight-to-weight ratio of about 80% to about 85% sodium alginate gum to about 15% to about 20% borate. In such a clumping animal litter, the sodium alginate and sodium borate can be combined in a weight to weight ratio of about 85% sodium alginate gum to 15% borate, wherein the combination of sodium alginate and sodium borate comprises about 1% to about 3% by weight of the litter composition.

A clumping animal litter as described herein can further comprise an odor control agent comprising about 5% or less by weight of the litter composition. The binding agent can further bind the odor control agent to the core particles, along with clumping agent(s). The odor control agent can comprise at least one odor absorbent material, for example an odor absorbent material selected from natural and synthetic zeolites, sodium bicarbonate, and magnesium hydroxide, or at least one odor masking fragrance, or any combination thereof.

In another aspect, the present disclosure provides a method of preparing a clumping animal litter from organic material, the method comprising, in the following order: obtaining granulized particles of an organic material; spraying the organic particles with an aqueous solution comprising a binding agent to impregnate the organic particles with the binding agent; mixing the organic particles and the powdered clumping agent for a time sufficient for the clumping agent to adhere to the surface of the organic particles, in amounts such that the organic substrate comprises about 50% to about 85% by weight of the litter, the binding agent comprises about 0.01% to about 10.0% by weight of the litter, and the clumping agent comprises about 10% to about 40% by weight of the litter; and drying the organic particles to a predetermined moisture content. In the method, the clumping agent can comprise sodium bentonite. The clumping agent can comprise a polysaccharide gum or a borated starch, in an amount such that the polysaccharide gum or borated starch comprises about 1% to about 3% by weight of the litter composition. In the method, the ratio of the amount of organic substrate to the amount of clumping agent in the litter can be about 2 to 1, about 2.5 to 1, about 3 to 1 or about 4 to 1. In the method, the organic substrate can comprise a non-agglomerated, hard granular, granulized or pelletized organic material, such as for example corncob grit. Alternatively, the organic material can be selected from corn cob, corn meal, soybean, soybean meal, wheat meal, wheat straw, alfalfa meal, peanut hulls, rice hulls, walnut shells, paper, paper sludge, pine sawdust, diaper fluff, and any combination thereof.

The core particles of organic material can have any size as described above for the clumping animal litter, such as for example a size of about 8 mesh to about 40 mesh, about 10 mesh to about 40 mesh, about 14 mesh to about 20 mesh, or about 14 mesh to about 40 mesh. In the method, the clumping agent(s), binding agent(s), adhesive compound(s), odor control agent(s), weight ratios of the different components, and all components can be as described above for the clumping animal litter. The method can provide a clumping animal litter with a predetermined moisture content of less than about 20% by weight, less than about 15% by weight, or less than about 8-12% by weight. An exemplary litter has a moisture content of no more than about 10% to about 20% by weight, preferably no more than about 10% to about 12% by weight.

The method can further comprise screening the dried organic particles to obtain particles in a size range of about 10 mesh to about 40 mesh, about 10 mesh to about 40 mesh, about 14 mesh to about 20 mesh, or about 14 mesh to about 40 mesh, and optionally further comprise at least one of i) adding excess fines less than about 40 mesh back into the mixing step; and ii) remilling particles having a size greater than about 10 mesh to produce remilled particles having a size of less than about 10 mesh and adding the resultant remilled particles back into the mixing step. The present disclosure also encompasses a clumping animal litter produced according to any of the methods described herein, and having a density of about 20 lbs/cu-ft to about 35 lbs/cu-ft.

DETAILED DESCRIPTION

The hybrid clumping animal litter described herein is prepared from core particles of plant derived, organic materials and a clumping agent that does not segregate from the absorbent litter granules, thus providing a lightweight, less costly clumping animal litter which also provides a way to recycle organic waste materials into useful product. In contrast to conventional clumping litters that consist exclusively or primarily of an inorganic clumping agent such as bentonite or another clumping clay, the clumping litter described herein combines organic materials with an inorganic clumping agent, and thus can be considered a "hybrid" clumping litter. The result is a clumping litter that has the absorbent properties of the plant derived organic litter substrate, and a low density due to the organic substrate. The hybrid clumping litter has a relatively low density of about 20 to about 35 lbs/cu-ft. In addition, the clumping litter does not have dust or ingredient segregation issues, is economical to produce, and is primarily made from recycling a material that would normally be considered a waste product.

A hybrid clumping animal litter is for example composed of core particles of organic, absorbent material, each impregnated with a clumping agent, and a binding agent that binds the clumping agent to the organic material particles/granules. An exemplary litter includes the core particles (or "substrate"), the binding agent for binding clumping agents to the core particles, the clumping agent, and optionally a clumping aid to help speed up clump formation.

Figure 1:
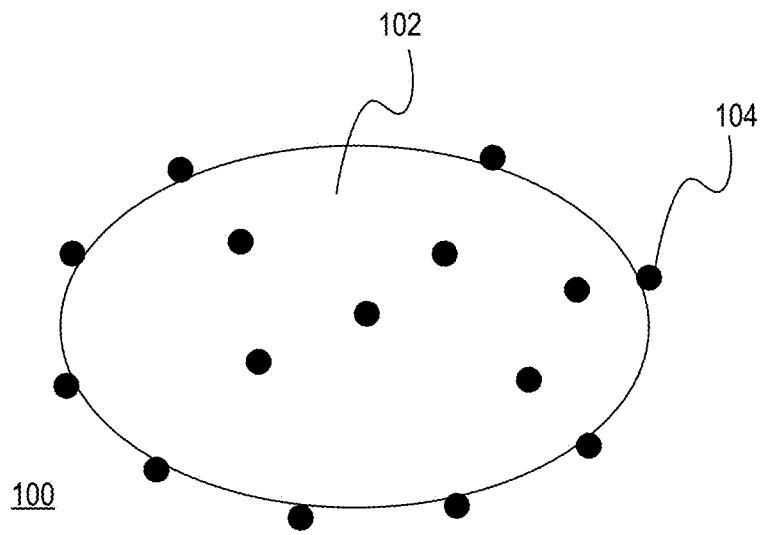
FIG. 1 is a schematic illustration of clumping agent particles scattered on the surface of core particles of organic material.
Figure 2:
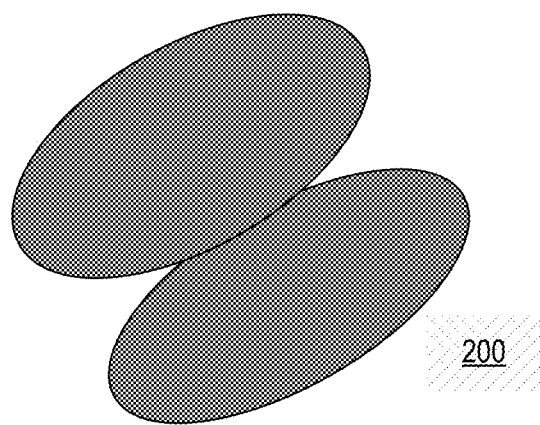
FIG. 2 is a schematic illustration of the clumping agent and core particles of organic material agglomerated together to form a hardened, removable clump.

An exemplary clumping agent comprises an inorganic material such as sodium bentonite. As used herein, the term "impregnated" means permeated, such that particles of the clumping agent are distributed on the surface of, and optionally further in pores of the core particles of organic material. As shown in FIG. 1, the clumping agent does not form a continuous or complete coating or encapsulate the core particles, but rather is distributed over the surface of the core particles in a manner which can be described as "decorating" the surface of the particles. This arrangement has been discovered by the inventors to strike a helpful balance between providing suitable clumping capability, and minimizing the use of an otherwise heavy clumping agent such as sodium bentonite. As the granules absorb moisture, interstitial bonding occurs between the surfaces of the inorganic clumping agent material and organic hybrid granules to form a clump. FIG. 2 is a schematic diagram of a hybrid litter composition after clumping of the hybrid granules following exposure to moisture, such as occurs when the animal urine contacts the dry litter composition. FIG. 2 shows essentially homogeneous agglomerated clumps of multiple individual core particles of organic material having a comparatively small amount of clumping agent distributed over the surface of the particles, without forming a substantially continuous coat on the particles. The inventors have further found that a clumping agent comprising both a clumping agent such as sodium bentonite and a further clumping aid or additive such as a borated starch or a polysaccharide gum, results in even faster formation and hardening of litter clumps than would otherwise be achieved using only the limited amounts of a clumping agent such as sodium bentonite. At the same time, the litter minimizes use of polysaccharide gums or borated starches, which are costly. Further, the binding agent can also further promote clumping upon contact with animal urine. The inventors have further discovered certain methods for preparing a hybrid litter to overcome various problems resulting from attempts to combine clumping agents and clumping agent combinations as described herein with organic materials.

Organic materials used for the core particles can be, for example, corncob corn meal, wood (e.g. pine) chips or sawdust, soybean, soybean meal, wheat meal, wheat straw, alfalfa meal, walnut shells, peanut hulls, rice hulls, wheat straw, paper or paper sludge, diaper fluff, or any combination thereof.

The particles can be any shape, such as spherical, elliptical, elongated, flat, or some other irregular shape. Preferably the materials are available as, or can be prepared as hard particles or granules or pellets. The particles should however not be agglomerated. It will be appreciated by those of routine skill in the art that a "hard" pellet or granule is firm, not easily friable, and can be handled in a mixer such as a rotating mixer, sprayed with an aqueous adhesive solution, and have powdered clumping agents attached to it, without disintegrating. Exemplary such particles would generate no more than about 1% fines or dust from mixing the substrate granules prior to adding the ingredients. Agglomerated particles are thus not suitable for the hybrid clumping litter. A rotating mixing process can be used to accomplish the mixing as detailed further below.

Core particles can be manufactured, in non-limiting example, from corncob. A hard corncob grit or firm corncob grit is preferred, rather than the chaff (i.e., "bee's wings") or softer parts of the corncob that have a lower density compared to corncob grit. The use of corncob grit results in a suitably hard surface, as compared to other particles made from softer materials, for applying the binding agent and clumping agent(s). Material that easily flies away, such as the chaff, is also difficult to spray with the binding agent and results in tracking, i.e., carrying of litter particles out of the litter box on the cat's fur or paws, which is a typical problem with most other litters. Additionally, corncob grit exhibits excellent absorbent properties, being capable of absorbing up to about 120% its weight in water. Other organic materials such as peanut hulls and soybean hulls can exhibit comparably high absorbency.

Corncob grit is derived from the hard middle woody ring of the corncob. An animal litter can contain for example about 100% of the organic core particles as corncob grit. The corncob grit is obtained by grinding the woody ring of the corncob into particles. Similarly, any organic materials used for the core particles can be ground or otherwise granularized according to many methods well known in the art. For example, 8×40 mesh granules that are suitable for spraying with the binding agent solution can be made by grinding organic material such as peanut hulls and/or soybean hulls to a powder, making pellets in a pellet mill, and then crumbling the pellets to obtain particles of the desired size as detailed below.

The binding agent is applied to the hard external surface of the core particles, for example by spraying. It will be appreciated that certain organic materials are porous and when they are used, the binding agent can be applied in such a manner, e.g., by spraying, that the binding agent distributes at least partially in at least a portion of the pores, and thus allows for at least partial binding of the clumping agent in some of the pores.

Core particles can be, for example, no larger than about 8 mesh (about 2.4 mm), and preferably no larger than about 10 mesh (about 2.0 mm). An example of a clumping animal litter uses particles as small as about 40 mesh (about 0.4 mm). A suitable range of core particle sizes is thus about 8 mesh to about 40 mesh. Another suitable range of core particle sizes is about 14 mesh to about 20 mesh, or about 1.4 mm to about 0.8 mm. Another suitable range of core particle sizes is about 14 mesh to about 40 mesh, or about 1.4 mm to about 0.4 mm. It will be recognized however that particles larger than about 8 mesh can be used, for example particles as large as ⅛ inch (3.175 mm) can be used, but that the larger granules tend to form much larger clumps and are more difficult to remove without breaking apart in the litter box. Further, larger clumps often stick to the bottom of the litter box and break apart upon removal, leaving pieces of soiled litter that contribute to odor. Thus, the preferred size range for satisfactory interstitial contact of particles (i.e., binding of absorbent granules together into a cohesive clump) to result in more easily removable clumps, is about 10 mesh (2.00 mm) to about 40 mesh (0.425 mm).

A clumping litter can comprise, for example, about 50% to about 80% by weight core particles comprising an organic substrate, about 0.01% to about 10.0% by weight of a binding agent impregnating the organic substrate, and about 10% to about 40% by weight of a clumping agent, optionally further comprising a polysaccharide gum or a starch comprising about 1% to about 3% by weight of the litter composition. The binding agent binds the clumping agent to the core particles. The ratio of organic substrate to total clumping agents can be, for example, from about 2 to 1 to about 4 to 1, or about 2 to 1, about 2.5 to 1, about 3 to 1 or about 4 to 1, by weight. Preferably the clumping agent such as sodium bentonite is no more than approximately 20% of the product, and any added gum or starch is no more than approximately 2% of the product. While the binding agent can be present at about 0.01% to about 10.0% by weight, certain litters use about 5% or about 7.5% by weight of the binding agent.

The binding agent binds the clumping agent to the core particles, to prevent or reduce segregation between the clumping agent and the core particles. The binding agent comprises for example an aqueous solution of an adhesive compound, which is preferably water soluble, such that it can be readily sprayed onto the core particles at relatively low pressures. The binding agent can comprise for example an aqueous solution of an adhesive compound, such as but not limited to a polyvinyl alcohol, guar gum, tara gum, xanthan gum, a hydrocolloid gum, sodium alginate, a latex, a starch, corn syrup, corn syrup solids, or any combination thereof. An aqueous solution of the adhesive compound should have a viscosity suitable for spraying and can contain, for example, a concentration of the adhesive compound of about 0.1% to about 5%, about 0.1% to about 10%, about 0.1% to about 75%, or about 0.1% to about 99% by weight. In exemplary, non-limiting clumping animal litters, the concentration of the adhesive compound in aqueous solution can be about 0.1% to about 5.0% by weight, or about 5% to about 15% by weight. Alternatively, the binding agent can comprise up to about 98% to about 99% or even 100% by weight of an adhesive compound in solution, such as in particular (but not limited to) any of the foregoing adhesive compounds that exist in liquid form at room temperature, such as corn syrup. It will be appreciated that certain liquid adhesive compounds such as corn syrup may require minimal addition of water, or even no water, to have a viscosity suitable for application to the core particles using conventional spraying equipment. While any such binding agents can be used, exemplary litters use as the binding agent an aqueous solution of polyvinyl alcohol, corn syrup or an aqueous solution of corn syrup, an aqueous solution of a starch, or an aqueous solution of a combination of sodium alginate with at least one polysaccharide other than sodium alginate, or any combination thereof. It will further be appreciated that minimizing the amount of moisture added to the litter during preparation will reduce the drying effort required to achieve a litter with a relatively low moisture content as described herein. An exemplary binding agent is one that can be suitably prepared for spraying at a relatively high concentration in aqueous solution, such as corn syrup. In a non-limiting but exemplary clumping animal litter, the ratio of the binding agent(s) to the organic core particles is less than about 15% by weight.

The clumping agent can comprise any one or more of various gelling or clumping clay and non-clay materials, such as attapulgite, bentonite, kaolinite, sepiolite, a polysaccharide gum, or a starch, or any combination thereof. A gelling material is absorbent and swells such that particles of the material clump together when moistened. Any of the gelling clays such as bentonite can be for example a sodium or calcium clay compound, e.g. sodium bentonite or calcium bentonite. A clumping material is absorbent and at least provides additional hardening of clumps formed upon contact of the litter with moisture. An exemplary, non-limiting clumping litter includes sodium bentonite as a clumping agent, which is optionally combined with polysaccharide gum or starch. A polysaccharide gum or starch can be borated. A borated material is simply that material mixed with a sodium borate, such as sodium tetraborate (anhydrous, pentahydrate or decahydrate forms can be used). For example, a borated starch is a starch mixed with a sodium borate. A borated polysaccharide gum is a sodium borate mixed with a polysaccharide gum. Suitable polysaccharide gums include, but are not limited to, sodium alginate, guar gum, tara gum, xanthan gum, locust bean gum, *cassia* gum, and carboxymethyl cellulose. Exemplary, non-limiting starches include wheat starch and potato starch, any of which can be borated. In an exemplary, non-limiting clumping animal litter, the clumping agent comprises sodium bentonite, and optionally further comprises a borated polysaccharide gum or borated starch. In another exemplary, non-limiting clumping animal litter, the clumping agent comprises sodium bentonite, and sodium alginate. In another exemplary, non-limiting clumping animal litter, the clumping agent comprises sodium bentonite and a combination of sodium alginate gum and sodium borate.

A clumping litter including both a clay such as sodium bentonite and a borated gum or borated starch, can for example comprise about 10% to about 40% by weight of the clay, and a combination of a polysaccharide gum or starch with sodium borate in a weight-to-weight ratio of about 80% to about 85% gum or starch (unborated) to about 15% to about 20% sodium borate. For example, a clumping litter may comprise a combination of sodium bentonite with a combination of sodium alginate gum and sodium borate combined in a weight-to-weight ratio of about 80% to about 85% sodium alginate gum to about 15% to about 20% borate. Another exemplary, non-limiting clumping animal litter comprises sodium alginate and sodium borate combined in a weight to weight ratio of about 85% sodium alginate gum to about 15% borate. The combination of the gum or starch (unborated) and the sodium borate can comprise, for example, about 1% to about 3% by weight of the litter composition. For example, a clumping litter can comprise sodium alginate and sodium borate which together comprise about 1% to about 3% by weight of the litter composition.

Clumping animal litters according to the present disclosure preferably have a total final moisture content of no more than about 10% to about 20% by weight. Exemplary, non-limiting clumping animal litters have a moisture content of no more than about 15%, preferably no more than about 10%, more preferably no more than about 8%, and still more preferably no more than about 5% by weight. An exemplary, non-limiting clumping animal litters has a moisture content of no more than about 10% to about 12% by weight.

Optionally, clumping animal litters as described herein can further include an odor control agent, which is also bound to the core particles by the binding agent. The odor control agent can comprise a powdered material that is mixed with the clumping agent before applying the clumping agent to the core particles. The odor control materials should be applied, for example, in small amounts, such as about 5% or less by weight, to properly adhere to the substrate granules. Thus the odor control agent may comprise about 5% or less by weight of the litter composition. The odor control agent can be selected from odor absorbent materials such as, but not limited to, natural and synthetic zeolites, sodium bicarbonate, and magnesium hydroxide; or an odor masking fragrance as known in the art, or any combination thereof. Zeolites are known to be particularly effective in trapping ammonia as well as certain sulfur odors. Sodium bicarbonate is a general odor absorbent. Magnesium hydroxide has not been previously used in a commercial product for litter box odor, but has been found to be an effective odor absorbent and neutralizer.

Other liquid additives can be sprayed onto the core particles either in the process of adding the clumping agents or after the drying and screening steps of the manufacturing process, as detailed below. Preferably such additives are applied after drying and screening to avoid loss of the liquid additives due to evaporation or heat degradation during the drying process. Examples of liquid additives include fragrance oils to further aid with odor control or to give the product a pleasant scent, antimicrobial materials to aid in preventing odor formation due to absorbing cat waste, and colorants to provide the product with an attractive color.

Figure 3:
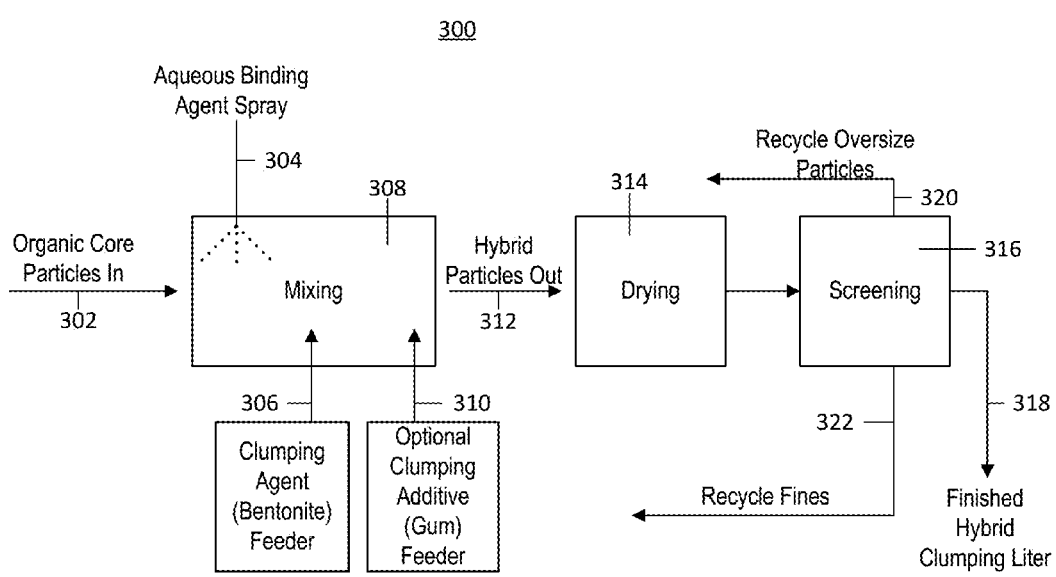
FIG. 3 is a flow chart of a first method for manufacturing a hybrid clumping animal litter.

The following steps are illustrative of a process 300 for preparing a clumping hybrid litter according to the present disclosure, as shown in part in the flow chart of FIG. 3. Dry, core particles comprising a hard, preferably non-agglomerated organic material are first obtained, or prepared as described above (not shown in FIG. 3). The organic core particles are added to a mixer 302. The core particles are sprayed 304 with a liquid comprising an adhesive compound. The liquid can be an aqueous solution of an adhesive compound as shown in FIG. 3, or can be an adhesive compound that exists in liquid form at room temperature such as corn syrup (not shown in FIG. 3) or any combination thereof. The clumping agent is added 306 and contacts the core particles. The clumping agent and sprayed core particles are mixed 308. Optionally, a clumping additive such as a borated polysaccharide gum or borated starch can be added 310, before or simultaneously with the addition of the clumping agent, and mixed with the sprayed core particles. Once mixing is complete, the treated particles are removed from the mixer 312 and dried 314 to a final moisture content as described elsewhere herein. The resulting dried particles are screened 316 to return litter particles of the desired size to produce a finished hybrid clumping litter 318. Oversize particles removed by screening can be recycled 320 into process 300 as substrate particles going into the mixer. Excess fines can be removed during screening 322 and also recycled into process 300.

Figure 4:
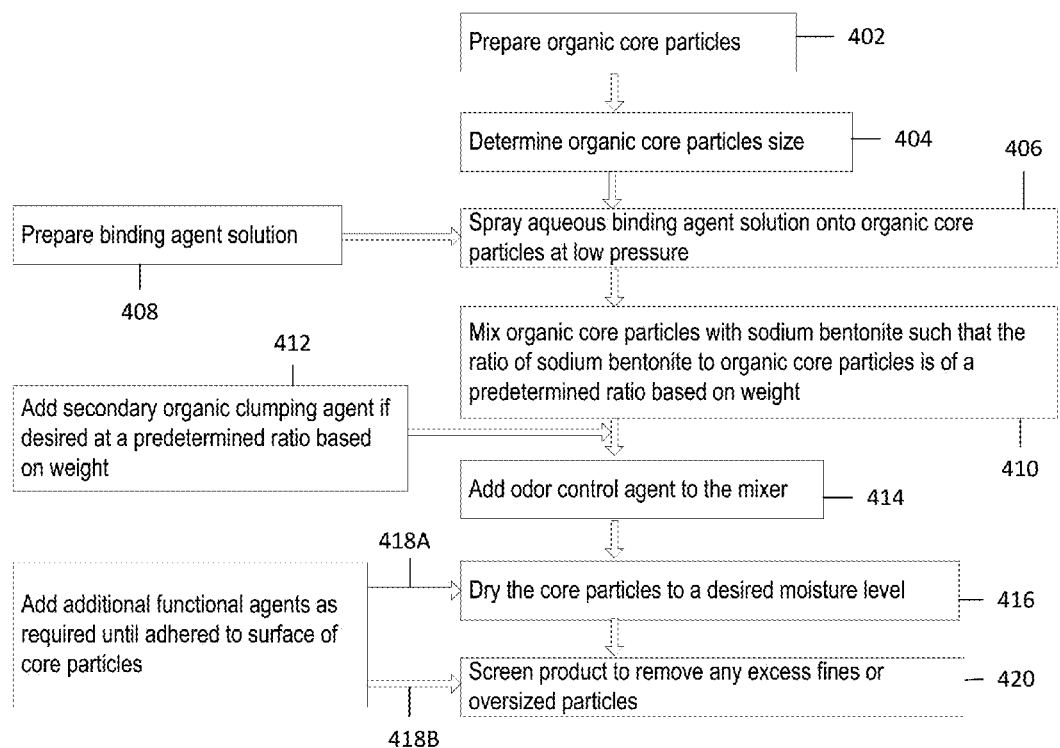
FIG. 4 is a flow chart of a second method for manufacturing a hybrid clumping animal litter.

As further shown in process 400 as shown in the flow chart of FIG. 4, obtaining core particles of organic material may involve a previous step of preparing organic core particles 402, which may involve screening organic particles to obtain particles in a predetermined size range 404 and as described herein above, for example of about 8 mesh to about 40 mesh, about 10 mesh to about 40 mesh, about 14 mesh to about 20 mesh, or about 14 mesh to about 40 mesh. More narrow size ranges result in a more uniform appearance of the litter, and a more tightly bound clump. In an exemplary, non-limiting clumping litter, corn cob grit is used for the core particles.

Some organic materials used for the core particles may need to be pre-formed, which may involve an agglomeration process to make the desired size range of rigid particles. Other organic or plant derived materials which can be used include, for example, granules of paper, wood chips or sawdust, walnut shells, peanut hulls, rice hulls, wheat straw, paper sludge, and diaper fluff. The organic material need only be available as a small granular and hard form, comparable to particles prepared from corncob grit. For example, particles suitable for spraying with the binding agent solution can be made by grinding organic material such as peanut hulls and/or soybean hulls to a powder, making pellets in a pellet mill, and then crumbling the pellets to obtain particles of the desired size. For any materials, particle size range is for example no larger than about 8 mesh (about 2.4 mm), preferably no larger than about 10 mesh (about 2.0 mm), to about 40 mesh (about 0.4 mm). It will be understood that smaller particle sizes are preferred for litter intended for use by cats because cats prefer smaller particle sizes for digging. The particles can be any shape, such as spherical, elliptical, elongated, flat, or some other irregular shape.

Once obtained, core particles of the desired size are placed in a rotating drum, such as an agglomeration drum, or other agglomerating or coating equipment such as a centrifugal coater, pan agglomerator, disc pelletizer, blender, or intensive mixer, such as those commercially available from Eirich Machine Company, Gurnee, Ill. In non-limiting example, a Rollo-Mixer® batch mixer commercially available from Continental Products Corp. (Milwaukee, Wis.) is used.

In a second step, the dry core particles are sprayed 406 with the binding agent, which can be an aqueous solution of an adhesive compound or an adhesive compound that exists in liquid form at room temperature, or a combination thereof. The binding agent may be prepared 408 previously or prepared at about the same time or just prior to spraying. Spraying step 406 is performed for example with the particles in the mixer, and can continue while the particles are rotating in the drum mixer or agglomerator or other mixing equipment, for a time and under conditions sufficient for the binding agent to substantially distribute over the surface of the core particles. A predetermined amount of clumping agent, such as sodium bentonite as shown in FIG. 4, is added and is mixed 410 with the core particles. Optionally, a clumping additive such as a borated polysaccharide gum or borated starch can be added 412, before or simultaneously with the addition of the clumping agent. The optional clumping agent can also be mixed with the particles. Optionally, an odor control agent can further be added 414 to the mixture. Once mixing is complete, the treated particles are removed from the mixer and dried 416 to a final, predetermined moisture content. Optionally, before or after drying 416, additional clumping agent, clumping additive and/or odor control agent(s) can be further added 418A, 418B to the mixture. The resulting dried particles are screened 420 to return litter particles of the desired size and recycle fines and oversize particles as shown in FIG. 3 to produce a finished hybrid clumping litter.

As detailed above, the adhesive compound chosen can be water soluble to produce an aqueous solution such that it can be sprayed onto the organic substrate granules at relatively low pressures. Alternatively, an adhesive compound as described herein that exists as a liquid at room temperature, for example corn syrup, can be used at approximately 98%, 99% or even 100% concentration in the spraying step. While it has been found that merely wetting the core particles with a relatively small amount water at about 5% to 20% by weight of the litter composition results in reasonable adherence of the clumping agent to the core particles, at the same time the use of an adhesive compound promotes further adherence of the clumping agent, reduces the water needed, and also promotes clump formation by the finished product. Additionally, the final drying step, detailed below, further removes water and thus reduces adherence of the clumping agent when only water is used to adhere the clumping agent to the core particles.

The binding agent can comprise the adhesive compound in aqueous solution at a concentration of about 0.1% up to about 98-99% or about 100% by weight. In non-limiting example, the aqueous solution consists of the adhesive compound dissolved in water at a concentration of about 0.1 to 2.0%, by weight. In another non-limiting example, the aqueous solution consists primarily of the adhesive compound dissolved in water at a concentration of about 75% to about 99% by weight. In exemplary, non-limiting methods for preparing a clumping animal litter, the concentration of the adhesive compound in aqueous solution can be about 0.1% to about 5.0% by weight, about 5% to about 15% by weight, or about 75% to about 99% by weight. When applied to the core particles, the final ratio of adhesive solids to core particles is, for example, no more than about 2% and preferably less than about 0.1%, by weight. The aqueous adhesive solution is applied such that the moisture of the product increases by no more than about 20%, preferably no more than about 10% to about 15%, and more preferably no more than about 0% to about 10% It should be understood that reducing the amount of moisture added during manufacturing will reduce the drying time required or even eliminate the need for a drying step completely, thereby reducing energy cost and time required in general. It should further be noted that another advantage of the litters and processes described herein is the relatively low amount of moisture used during processing, and thus reduced drying requirement, compared to those required for making completely coated litter particles.

The sprayed core particles are subsequently contacted with an amount of powdered clumping agent sufficient for the clumping agent to adhere to only a portion of the surface of each core particle. The time and/or conditions needed for this step can be readily determined by one of routine skill based on visual inspection of the core particles as they are mixed with the clumping agent. The core particles of organic substrate will have a color distinct from the color of the clumping agent. For example, sodium bentonite is essentially gray, while organic particles of corn, wood and the like generally have a yellowish or brownish color. Mixing should cease at least before the point that the particles are obviously coated completely and exhibit only the color of the clumping agent used. In an exemplary method, mixing should cease while the core particles still retain the general color and appearance of the core particles being used, with perhaps a slight graying or muddying of initial color due to particles of the clumping agent being randomly dispersed on the particle surfaces. It should be noted however that time is not necessarily a determining factor for avoiding a complete coating of the core particles with the clumping agent. The amount of time required in the mixer to achieve a partial coating is, in non-limiting example, only about 1 min to about 5 min. Rather, the relative amount of clumping agent compared to the amount of core particles limits the ability of the clumping agent to form a complete coat on the core particles. It will be understood that within the broader range of about 10% to about 40% by weight of the clumping agent, a lower amount of the clumping agent relative to the amount (by weight) of the core particles, provides less material and thus less likelihood of even being able to achieve a complete coating. According to the present disclosure however, the relative amounts of clumping agent and core particles described herein have been found to provide clumping performance comparable to that exhibited by 100% sodium bentonite. Clumping performance can be readily tested using synthetic urine (mix of various salts and urea), actual cat urine, or a 2% sodium chloride solution.

It has been found that the mixing step should be performed only after the core particles have been sprayed with a liquid solution containing the binding agent, and that the binding agent and clumping agent should not be combined first and then applied to the core particles, or else the clumping agent does not sufficiently adhere to the core particles. For example, following spraying, the wet core particles are rotating in the drum and a pre-determined amount of the clumping agent as a dry powder is added to the rotating drum. The clumping agent can be dispensed into the drum with a screw feeder, for example. Typically the clumping agent, such as for example sodium bentonite, is a powder consisting of particles having a size of less than 100 mesh (0.150 mm) and preferably less than 200 mesh (0.075 mm). In exemplary method for preparing a clumping litter using corncob grit as the core particles, and sodium bentonite as a clumping agent, the amount of sodium bentonite in the litter is about 10% to about 40% by weight, preferably about 20% to 25% by weight, to achieve good clumping strength while minimizing use of the sodium bentonite.

In alternative clumping litters, a gum may be combined with a first clumping agent and added to the drum or other mixer at about the same time with the first clumping agent. For example, a gum, such as borated sodium alginate, can also be added simultaneously with a separate screw feeder, when a first clumping agent such as sodium bentonite is being added as described above. Alternatively, the gum can be premixed with the first clumping agent such as sodium bentonite, and the combination added to the drum or other mixer using a single screw feeder. When used, such gums comprise a dry powder having a particle size of less than about 30 mesh (about 0.6 mm) and preferably less than about 50 mesh (about 0.3 mm). A gum used in combination with a first clumping agent such as sodium bentonite can comprise about 1 to 3% by weight, and preferably about 1 to 2% by weight of the litter composition.

After the mixing and is complete, the product exits the mixer or agglomerator and is dried to a predetermined moisture content, usually less than about 20%, and preferably less than about 15%, by weight. An exemplary but non-limiting range of moisture content is about 8-12%, or about 10% to about 12% by weight. Another exemplary but non-limiting range of moisture content is no more than about 10% to about 20% by weight. Drying can occur in any drying equipment as recognized in the art, such as a rotary dryer, fluid bed dryer, or tray dryer. Alternatively, drying can be performed within a mixer or other mixing equipment by passing hot air through the mixer while the product is being mixed, or after the product is mixed. Preferably, a minimal amount of moisture is added to the litter during preparation such that relatively little drying is required to achieve a litter with a desired moisture content. Preferably, the excess moisture removed is less than 20% by weight and preferably only about 10% by weight, for a rapid and efficient drying process. The product is then screened to the desired size range of 10 mesh (2.00 mm) to 40 mesh (0.425 mm) to remove any excess fines and oversized particles. Excess additive fines (less than 40 mesh) can be recycled back into the mixing/coating process. Any oversized particles (for example, particles greater than 10 mesh) can be recycled back to be milled down to less than about 10 mesh and then re-enter the process. This method produces a litter product that after drying and screening is an effective clumping litter that has a relatively low density in the 20-35 lbs./cu-ft. range. The foregoing method can be readily used or adapted to prepare any of the litters described herein.

The foregoing method can be used to combine the components in amounts such that the core particles comprise about 50% to about 85% by weight of the litter, the binding agent comprises about 0.01% to about 10.0% by weight of the litter, and the clumping agent comprises about 10% to about 40% by weight of the litter. The adhesive compound can be applied, for example, to the core particles in an amount sufficient to produce in the clumping litter composition a weight to weight ratio of less than about 15% of the adhesive compound to the organic material.

EXAMPLES

The following example(s) are included to demonstrate the disclosure. It should be appreciated by those of skill in the art that the techniques disclosed in the following examples represent techniques discovered by the inventors to function well in the practice of the disclosure. Those of skill in the art should, however, in light of the present disclosure, appreciate that many changes could be made and still obtain a like or similar result without departing from the spirit and scope of the disclosure. Therefore all matter set forth is to be interpreted as illustrative and not in a limiting sense.

Example 1

Hybrid Clumping Animal Litter

Corncob granules in a size range of 14 mesh (1.40 mm) to 40 mesh (0.425 mm) were sprayed with about a 0.5% aqueous solution of sodium alginate combined with other polysaccharides. The adhesive liquid to corncob granule ratio was 1 part aqueous solution to 20 parts corncob granules. This resulted in about 0.025% by weight adhesive solids on the corncob granule surfaces. Immediately after wetting the particles in a pan mixer, a mixture of sodium bentonite and borated sodium alginate (e.g., about 85% sodium alginate combined with about 15% sodium borate) was added in a ratio of 30 parts sodium bentonite and 2 parts borated sodium alginate to 100 parts corncob granules by weight. This translates to about 30% by weight sodium bentonite and about 2% by weight borated alginate added to the corncob granules.

After mixing for about 30 seconds the product was dried to a moisture value of about 10% and then screened to a 14 mesh (1.40 mm) by 40 mesh (0.425 mm) product to remove any oversized aggregates and excess clumping additive fines.

The final product had a bulk density of about 24 lbs./cu-ft.

Example 2

Clumping Performance

Hybrid clumping animal litter from Example 1 was tested for clumping performance using a saline solution consisting of 2% sodium chloride to simulate cat urine. A volume of 10 ml of the saline solution was dropped onto the litter in a pan to form clumps. After 1 hour the clumps were removed and their strength tested using a Chatillon force gauge. This measures how much compressive strength is required to break the clumps. Two commercially available clumping cat litters that contain corncob granules were also tested for comparison. Results are listed in Table 1. The clump strengths for the corncob product made by this process are either better than or at least comparable to any natural plant derived or alternative clumping cat litters currently on the market. Due to the relatively low density of the product the amount of material on a weight basis necessary to absorb the simulated urine is less than what would be required if the litter was based entirely on sodium bentonite. This product absorbed about 90 to 100% of its weight versus about 45% for a clay litter using sodium bentonite as the clumping agent.

TABLE 1

Comparative Clump Strength

| Clump Strength (lbs of force) - after 1 hour | Hybrid clumping litter | Arm & Hammer Natural Essentials ® (corncob and guar gum) | Tidy Cats ® Pure Nature (mixture of corncob, pine, and cedar with gum clumping agent) |
| --- | --- | --- | --- |
| Avg from 3 clumps | 1.16 | 0.63 | 0.93 |

Example 3

Hybrid Clumping Animal Formulations

Hybrid clumping litters according to the following formulations have been made following the process outlined in Example 1.

TABLE 2

Litter Formulations

| Ingredient | Typical % By Weight | % By Weight Range |
| --- | --- | --- |
| Substrate - corncob granules, peanut hull granules, soybean hull granules | 69.5 | 50-85% |
| Corn Syrup Binder (concentrate diluted in water 50:50 or other dilutions up to 75:25) Can use PVA or other water-soluble adhesive binders. | 7.5 of concentrate | 1-15% |
| Sodium Bentonite - primary clumping agent | 20% | 15-30% |
| Clumping Aid - wheat starch mixed with sodium tetraborate (anhydrous or pentahydrate or decahydrate). An exemplary mix is 80% starch and 20% borate. Other clumping aids to use include various hydrocolloids, such sodium alginate, guar gum, etc. | 3% | 0-5% |

Example 4

Hybrid Clumping Animal Formulations

Hybrid clumping litters using corncob core particles, corn syrup as the adhesive material for the binding agent, and a mixture of sodium bentonite and borated wheat starch for the clumping agent, were made following the process outlined in Example 1.

TABLE 3

A corncob-based hybrid clumping litter formulation

| Ingredient | % By Weight | Lbs/200 lb. Batch |
| --- | --- | --- |
| Substrate (corncob) | 69.5 | 139 |
| Corn Syrup Binder (concentrate diluted 50% in water) | Spray at 15% of total product weight (7.5% actual corn syrup) | 30 of diluted binder (15 actual binder) |
| Sodium Bentonite | 20% | 40 |
| Mixture of Wheat Starch and Sodium Borate (Premixed) | 3% | 6 |

Example 5

Hybrid Clumping Animal Formulations

Hybrid clumping litters using corncob core particles, corn syrup as the adhesive material for the binding agent, and sodium bentonite (without borated wheat starch) for the clumping agent, were made following the process outlined in Example 1.

TABLE 4

A corncob-based hybrid clumping litter formulation

| Ingredient | % By Weight | Lbs/200 lb. Batch |
| --- | --- | --- |
| Substrate (corncob) | 67.5 | 135 |
| Corn Syrup Binder (concentrate diluted 50% in water) | 15% of total product weight (7.5% corn syrup) | 30 of diluted binder (15 actual binder) |
| Sodium Bentonite | 25% | 50 |

Example 6

Hybrid Clumping Animal Formulations

Hybrid clumping litters using peanut hull core particles, corn syrup as the adhesive material for the binding agent, and a mixture of sodium bentonite and borated alginate for the clumping agent, were made following the process outlined in Example 1.

TABLE 4

A peanut hull-based hybrid clumping litter formulation

| Ingredient | % By Weight | Lbs/200 lb. Batch |
| --- | --- | --- |
| Substrate (peanut hulls) | 67.5 | 139 |
| Corn Syrup Binder (concentrate diluted 50% in water) | 15% of total product weight (7.5% corn syrup) | 30 of diluted binder (15 actual) |
| Sodium Bentonite | 22% | 44 |
| Borated Alginate | 1% | 2 |

What is claimed is:

1. A clumping animal litter comprising:
   (a) core particles consisting essentially of an organic substrate, the core particles having an external surface;
   (b) a binding agent applied to the external surface of the core particles; and
   (c) a clumping agent applied to the external surface of the core particles, wherein the clumping agent is adhered by the binding agent to the external surface of the core particles, the clumping agent optionally further comprising a borated polysaccharide gum or a borated starch;
   wherein the litter comprises about 50% to about 85% by weight of the core particles, about 0.01% to about 10% by weight of the binding agent, and about 10% to about 40% by weight of the clumping agent, and optionally about 1% to about 3% by weight of the borated polysaccharide gum or borated starch, and wherein the ratio of the core particles to clumping agents in the animal litter is about 2.5 to 1 to about 4 to 1.

2. A clumping animal litter according to claim 1, wherein the binding agent is non-uniformly distributed over the external surface of the core particles.

3. A clumping animal litter according to claim 1, wherein the clumping agent comprises no more than about 20% by weight of the litter.

4. A clumping animal litter according to claim 1, wherein the organic substrate is selected from the group consisting of corn cob, corn meal, soybean, soybean meal, wheat meal, wheat straw, alfalfa meal, peanut hulls, rice hulls, walnut shells, paper, paper sludge, pine sawdust, diaper fluff, and any combination thereof.

5. A clumping animal litter according to claim 1, wherein the organic substrate comprises corncob grit.

6. A clumping animal litter according to claim 1, wherein the core particles have a size of about 8 mesh to about 40 mesh.

7. A clumping animal litter according to claim 1, wherein the binding agent comprises an aqueous solution of an adhesive compound.

8. A clumping animal litter according to claim 7, wherein the adhesive compound is selected from a polyvinyl alcohol, guar gum, tara gum, xanthan gum, a hydrocolloid gum, sodium alginate, a latex, a starch, corn syrup, corn syrup solids, and any combination thereof.

9. A clumping animal litter according to claim 7, wherein the adhesive compound is selected from a polyvinyl alcohol, a starch, and a combination of sodium alginate with at least one polysaccharide other than sodium alginate.

10. A clumping animal litter according to claim 7, wherein the concentration of the adhesive compound in the aqueous solution is about 0.1% up to about 5% by weight, in solution.

11. A clumping animal litter according to claim 7, having a ratio of the adhesive compound to the core particles of less than about 15% by weight.

12. A clumping animal litter according to claim 7, having a moisture content of no more than about 10% to about 20% by weight.

13. A clumping animal litter according to claim 1, wherein the clumping agent comprises a material selected from attapulgite, sodium bentonite, kaolinite, sepiolite, or any combination thereof, and further comprises a borated polysaccharide gum, and a borated starch, or any combination thereof.

14. A clumping animal litter according to claim 13, wherein the clumping agent comprises sodium bentonite and further comprises borated wheat starch.

15. A clumping animal litter according to claim 1, further comprising an odor control agent comprising about 5% or less by weight of the litter composition.

16. A clumping animal litter according to claim 15, wherein the binding agent further binds the odor control agent to the core particles.

17. A clumping animal litter according to claim 15, wherein the odor control agent comprises at least one material selected from natural and synthetic zeolites, sodium bicarbonate, and magnesium hydroxide.

18. A clumping animal litter according to claim 1, wherein: the organic substrate comprises corn cob grit; the clumping agent is sodium bentonite and further comprises borated wheat starch; and the binding agent is corn syrup; wherein the litter comprises about 69.5% by weight corn cob grit, about 20% by weight sodium bentonite, about 3% by weight borated wheat starch, and about 7.5% by weight of corn syrup.

* * * * *